(12) United States Patent
Cheng

(10) Patent No.: US 6,354,670 B1
(45) Date of Patent: Mar. 12, 2002

(54) CLAMPING ASSEMBLY OF AN AXLE OF A WHEEL

(76) Inventor: Kenny Cheng, No. 16, Lane 47, Chih Feng St., Taipei (TW)

( * ) Notice: Subject to any disclaimer, the term of this patent is extended or adjusted under 35 U.S.C. 154(b) by 0 days.

(21) Appl. No.: 09/745,880

(22) Filed: Dec. 21, 2000

(51) Int. Cl.$^7$ ................................................. B60B 27/02
(52) U.S. Cl. .................................. 301/111.04; 301/121
(58) Field of Search ................................. 301/111, 119, 301/120, 121

(56) References Cited

U.S. PATENT DOCUMENTS

| | | | |
|---|---|---|---|
| 4,043,685 A | * | 8/1977 | Hyams ........................ 301/111 |
| 5,215,356 A | * | 6/1993 | Zin ............................ 301/111 |
| 5,277,480 A | * | 1/1994 | Chiu ........................... 301/111 |
| 5,716,107 A | * | 2/1998 | Parker et al. ........... 301/121 X |
| 5,800,023 A | * | 9/1998 | Hartenstine et al. ........ 301/111 |
| 5,938,294 A | * | 8/1999 | Chan ....................... 301/121 X |

* cited by examiner

Primary Examiner—Russell D. Stormer
(74) Attorney, Agent, or Firm—Harness, Dickey & Pierce, P.L.C.

(57) ABSTRACT

A clamping assembly for clamping an axle of wheel is provided. The clamping assembly comprises: a seat including an upper plate and a hollow cylinder integrally formed with the upper plate, the upper plate having a protrusion with a notch, an opening, two grooves provided beside the opening, the distance between the grooves being increased as the notch is closed, and two parallel walls on both sides of the notch; a clamp including an arc-shaped pull positioned on the notch, said pull having two parallel arms for abutting against the two walls of the seat, and two resilient legs, the distance of the legs being gradually wider toward their ends, and a guiding block; a cover having an inner rim for engaging the seat; and a rivet punching through the cover and the seat.

1 Claim, 4 Drawing Sheets

CLAMPING ASSEMBLY OF AN AXLE OF A WHEEL

BACKGROUND OF THE INVENTION

1. Field of the Invention

The invention relates to a clamping assembly for clamping an axle of a wheel and preventing the wheel from unintentionally moving away from the axle. More specifically, the invention relates to a clamping assembly for using in the wheel of the stroller so as to clamp the axle and prevent from the wheel being unintentionally removed.

2. Description of Prior Arts

Strollers are used frequently and widely for people's caring about their children. Up to now, the safety and convenience are two most important factors to which stroller manufactures and users concern. In the axle of wheel of prior art, the easiest way to prevent from the wheel being unintentionally escaped from the axle is to use a cap-shaped stopper to engage into the ends of the axle, and thus the wheel may be stopped from escaping by the stopper. However, the cap-shaped stopper of prior art is apt to drop for unintentional collision. Therefore, the prior art can not completely prevent the wheel from escaping, and thus a danger situation may happen.

In another prior art, such as those shown in FIGS. 1 and 2, the clamp comprises a seat 1, a pair of clamping elements 2, and a cover 3. In the prior art, when a wheel is either engaged or disengaged into/from the axle 7, a force is applied and pressed to the clamping elements 2, such that two arms 4 of the clamping elements 2 are moved along walls 5 provided inside the seat 1. When center holes 6 of the clamping elements 2 are aligned with each other, an annular groove 8 on the axle 7 may enter/exit the center holes 6. Thereafter, due to the resilience of the arms 4 of the clamping elements 2, the clamping elements 2 may return to a position that the force has not applied to. Thereby, the axle 7 is clamped for its annular groove 8 is clamped by the center holes 6 of the clamping elements 2.

In the above prior art, the cover 3 may drop by unintentional collision, then the elements covered by the cover 3, such as the clamping elements 2, may also drop, and thus the whole clamp may be destroyed and the wheel will escape from the axle, which will cause a dangerous status for the baby seated on the stroller. In addition, the clamping elements 2 may be pressed by unintentional collision, and thus the axle 7 escapes from clamping of the center holes 6, which may cause the wheel moving from the axle 7. Furthermore, the clamp of the prior art is more complicated for comprising more elements, and thus its cost is higher.

In view of the problems exist in the prior art, how to design a easier rather complicated and safe damping assembly of the axle of wheel is still a very important subject for the stroller.

SUMMARY OF THE INVENTION

The invention is aimed at overcoming the problems existing in the prior art.

It is, therefore, an object of the invention to provide a clamping assembly of the axle of wheel, which, even being collided, will not separate from the axle, and thus a complete safety for the user and baby may be obtained.

Another object of the invention is to provide a clamping assembly of the axle of wheel, where the clamping element will not lose clamping function for the annular groove of the axle under intentional or unintentional collision. Therefore, the axle will not easily move away from the clamping assembly, and thus dangerous situations will not occur.

The other object of the invention is to provide a clamping assembly of the axle of wheel, where its structure is simple, and thus the cost thereof is reduced.

To accomplish the above objects, according to the invention, there is provided a clamping assembly for clamping an axle of a wheel, comprising:

a seat including an upper plate and a hollow cylinder integrally formed with the upper plate, the upper plate having a protrusion extending from the periphery of the plate with a notch, an opening on the center of the plate for connecting with the hollow cylinder, two grooves provided beside the opening and the distance between the grooves being increased as closing the notch, and two parallel walls with the same height as the protrusion being arranged on both sides of the notch;

a clamp including an arc-shaped pull positioned on the notch for completing a circle with the protrusion, said pull having two parallel arms for abutting against the two walls of the seat, and two resilient legs, the distance of the legs being gradually wider toward their ends, and a guiding block being downward extended from the end of each legs for engaging into the grooves of the seat;

a cover having an inner rim for engaging the seat; and a rivet punching through the cover and the seat for fastening the engagement therebetween, whereby, during engaging of the clamping assembly with the axle, by using a slant surface provided on the end of the axle, the two legs of the clamp are expended, and thus an annular groove provided on the axle may smoothly position between the two legs, and the two legs then return to their original position by their resilience, so as to assemble the axle to the clamp, while during disengaging, the pull is pulled outward, the guiding blocks are moved along the grooves, and thus the two legs are expanded, then the annular groove of the axle may disengage from the clamp.

Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the invention. It should also be realized by those skilled in the art that such equivalent constructions do not depart from the spirit and scope of the invention as set forth in the appended claim.

BRIEF DESCRIPTION OF THE DRAWINGS

For a further understanding of the nature and objects of the invention, reference may be made to the following detailed description taken in conjunction with the accompanying drawings in which.

DETAILED DESCRIPTION OF THE INVENTION

An preferred embodiment of the invention will now be described hereinbelow with reference to the FIGS. 2, 3, and 4.

Figure 1:
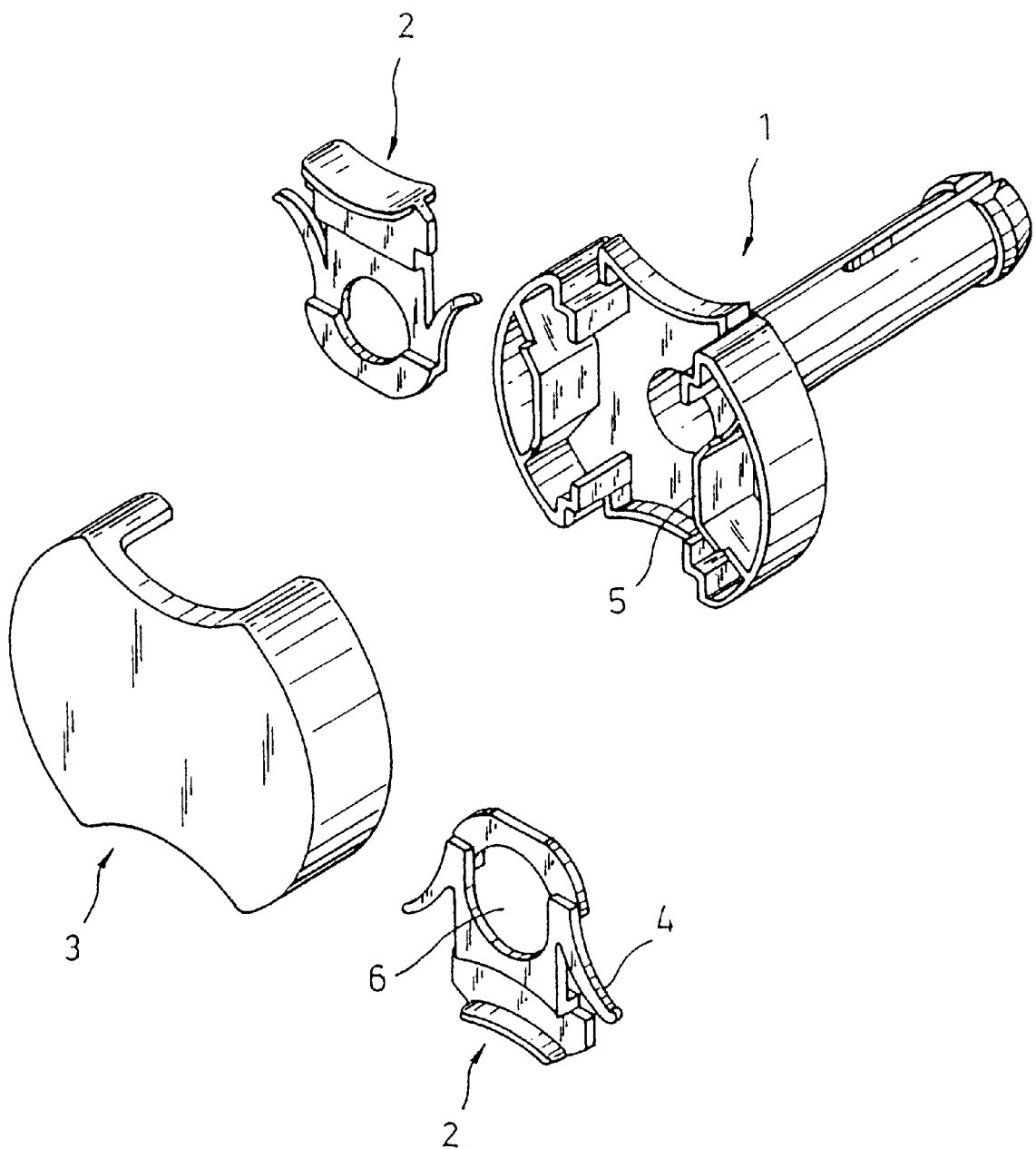
FIG. 1 is an exploded view of the conventional clamp assembly for a axle of a wheel.
Figure 2:
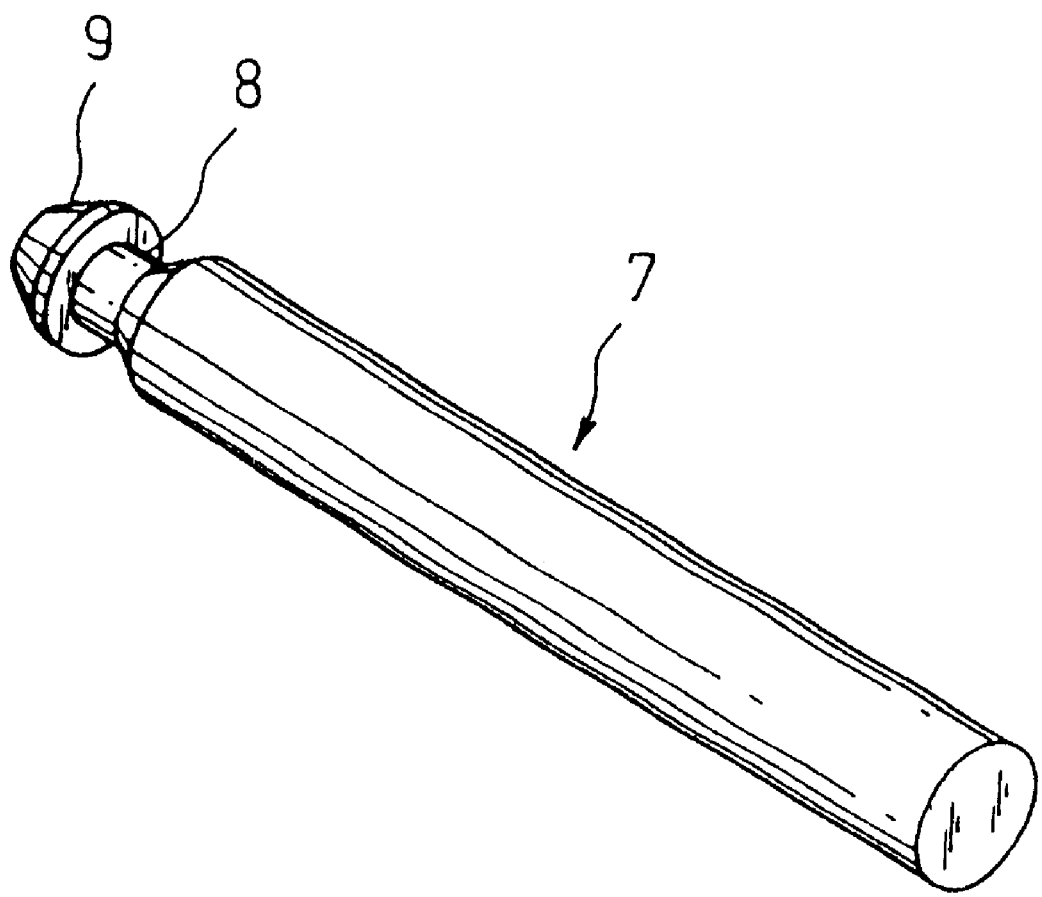
FIG. 2 is a perspective view of an axle used in the invention.

As shown in FIG. 2, the axle 7 used in the invention is the same as general axle and has a slant surface 9 at its front end and an annular groove 8 formed behind the slant surface 9.

Figure 3:
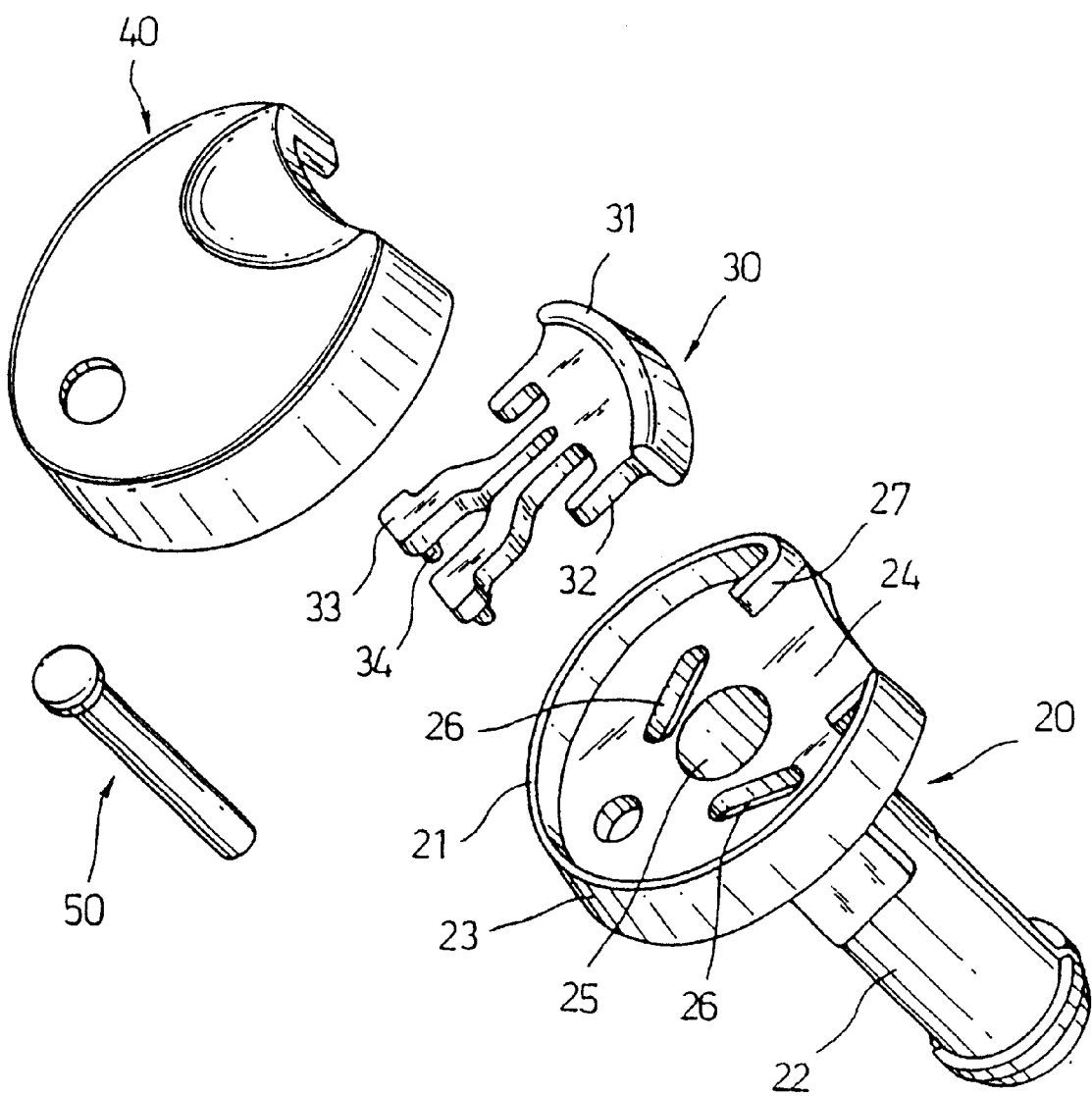
FIG. 3 is an exploded view of the clamping assembly of the invention.
Figure 4:
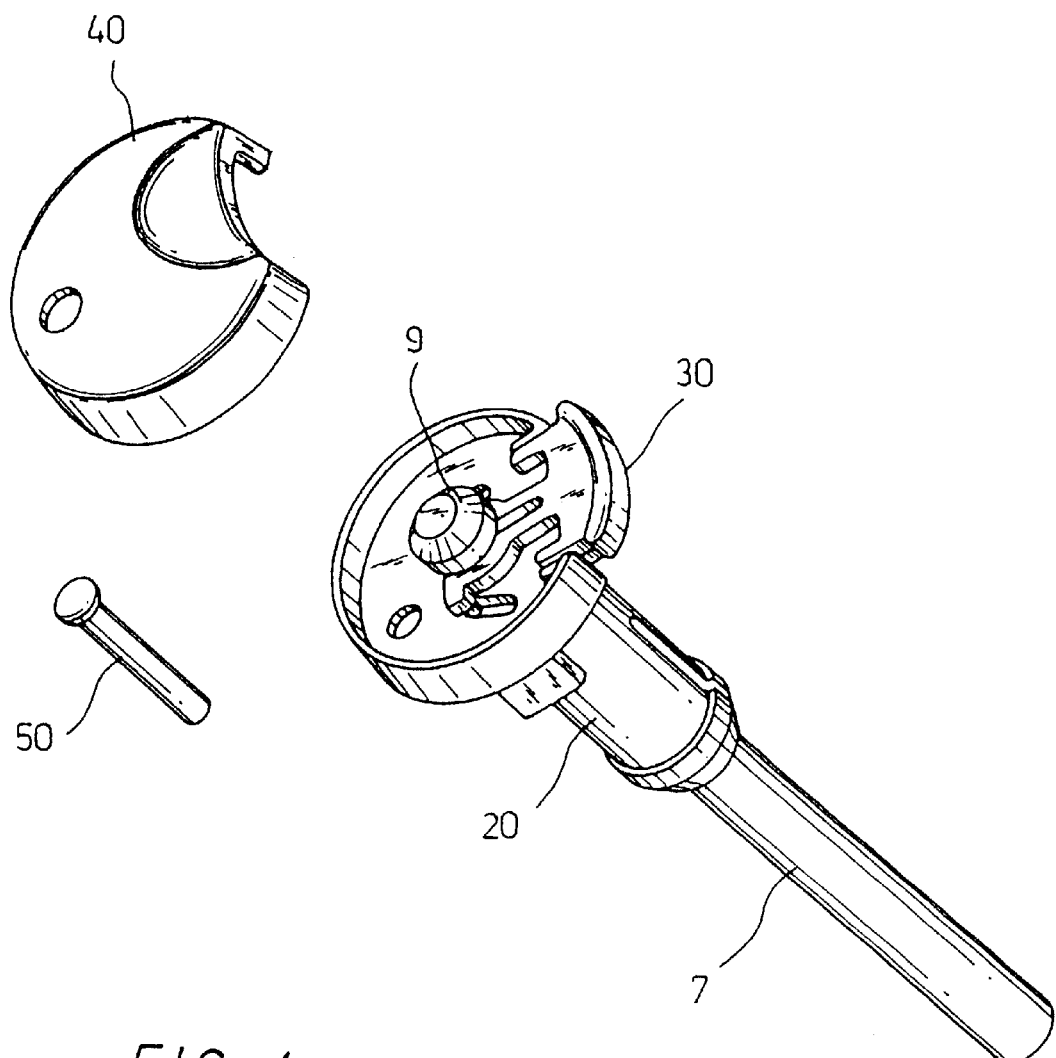
FIG. 4 is a perspective view showing that the axle has been engaged into the clamp assembly, where the cover is removed for easily understanding.

Then referring to FIG. 3, an exploded view of the clamping assembly 10 of the invention is shown. The clamping assembly 10 of the invention comprises a seat 20, a clamp 30, a cover 40, and a rivet 50.

The seat 20 includes an upper plate 21 and a hollow cylinder 22 integrally formed with the upper plate 21. The upper plate 21 comprises a protrusion 23 extending from the periphery of the upper plate 21, a notch 24, an opening 25 on the center of the upper plate 21 for connecting with the hollow cylinder 22, two grooves 26 provided beside the opening 25 and the distance between the grooves 26 being increased as the notch is closed 24, and two parallel walls 27 integrated formed with the protrusion 23 with the same height being arranged on both sides of the notch 24.

The clamp 30 includes an arc-shaped pull 31 positioned on the notch 24 for completing a circle with the protrusion 23. The pull 30 comprises two parallel arms 32 for abutting against the two walls 27 of the seat 20, and two resilient legs 33. The distance of the legs is gradually wider toward their ends, and a guiding block 34 is downward extended from the end of each legs 33 for engaging into the grooves 26 of the seat 20.

The cover 40 comprises an inner rim (which is not shown in figures) for engaging the seat 20 during assembly.

The rivet 40 is punched through the cover 40 and the seat 20 for fastening the engagement therebetween.

Follows are the detail of the operation of the clamping assembly 10 of the invention.

During engaging of the clamping assembly 10 with the axle 7, by inserting the axle 7 into the opening 25 through the hollow cylinder 22, the two legs 33 of the clamp 30 are expanded or separated by the bias function of the slanted surface 9 provided on the end of the axle 7, and then the annular groove 8 provided on the axle 7 may smoothly position between the two legs 33. The two legs 33 then return to their original position by their resilience. Consequently, the axial 7 is clamped by the clamping assembly 10.

While during disengaging, the pull 31 is pulled outward, the guiding blocks 34 are moved along the grooves 26. Due to the distance between the grooves 26 is larger toward the notch 24, the two legs 33 are expanded, then the annular groove 8 of the axle 7 may disengage from the clamp 30. Therefore, the axle 7 may disengage from the clamping assembly 10.

In a preferred embodiment of the invention, the rivet 50 is further provided to punch through the cover 40 and the seat 20 for strengthening the engagement between the cover 40 and the seat 20. Therefore, either intentional or unintentional collision will not make the axle 7 separating from the clamping of the clamping assembly 10.

The number of elements used in the invention are less than the prior art, and thus the structure of the invention is less complicated and the cost thereof is significantly reduced.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of the construction and combination of arrangement of parts may be resorted to without departing from the spirit and scope of this invention.

What is claimed is:

1. A clamping assembly for clamping an axle of a wheel, comprising:

a seat including an upper plate and a hollow cylinder integrally formed with the upper plate, said upper plate having a protrusion extending from the periphery of the plate with a notch, an opening on the center of the plate for connecting with the hollow cylinder, two grooves provided beside the opening and the distance between the grooves being increased as the notch is closed, and two parallel walls with the same height as the protrusion being arranged on both sides of the notch;

a clamp including an arc-shaped pull positioned on the notch for completing a circle with the protrusion, said pull having two parallel arms for abutting against the two parallel walls of the seat, and two resilient legs, the distance of the legs being gradually wider toward their ends, and a guiding block extending from the end of each leg for engaging into the grooves of the seat;

a cover having an inner rim for engaging the seat; and a rivet extending through the cover and the seat for fastening the engagement therebetween, whereby, during engaging of the clamping assembly with the axle, a slanted surface provided on the end of the axle separates the two legs of the clamp are expended, and thus an annular groove provided on the axle may smoothly position between the two resilient legs, and the two resilient legs then return to their original position, so as to assemble the axle to the clamp, while during disengaging, the pull is pulled outward, the guiding blocks are moved along the grooves, and thus the two legs are expanded, then the annular groove of the axle may disengage from the clamp.

* * * * *